United States Patent
Hippelainen

(10) Patent No.: US 7,590,742 B2
(45) Date of Patent: Sep. 15, 2009

(54) IP ADDRESS MANAGEMENT

(75) Inventor: Lassi Hippelainen, Helsinki (FI)

(73) Assignee: Nokia Corporation, Espoo (FI)

( * ) Notice: Subject to any disclaimer, the term of this patent is extended or adjusted under 35 U.S.C. 154(b) by 865 days.

(21) Appl. No.: 10/790,726

(22) Filed: Mar. 3, 2004

(65) Prior Publication Data

US 2005/0132058 A1    Jun. 16, 2005

(30) Foreign Application Priority Data

Dec. 16, 2003    (EP) .................................. 03028897

(51) Int. Cl.
G06F 15/16    (2006.01)

(52) U.S. Cl. ..................... 709/227; 370/237; 370/360; 370/231; 370/230; 370/234; 370/235; 370/236; 370/400; 370/412; 711/113; 711/143; 711/136; 711/114

(58) Field of Classification Search ................. 709/200, 709/227, 245
See application file for complete search history.

(56) References Cited

U.S. PATENT DOCUMENTS

| 6,321,267 | B1 * | 11/2001 | Donaldson ................. 709/229 |
| 6,871,210 | B1 | 3/2005 | Subramanian |
| 2001/0005858 | A1 * | 6/2001 | Ohno et al. ................. 709/223 |
| 2002/0054602 | A1 * | 5/2002 | Takahashi et al. ........... 370/412 |
| 2003/0225892 | A1 | 12/2003 | Takusagawa et al. |
| 2004/0071164 | A1 * | 4/2004 | Baum ......................... 370/469 |
| 2005/0021939 | A1 | 1/2005 | Le et al. |
| 2005/0027778 | A1 * | 2/2005 | Dimitrelis et al. ........... 709/200 |

FOREIGN PATENT DOCUMENTS

| JP | 2000-316002 | 11/2000 |
| JP | 2001-77855 | 3/2001 |
| JP | 2002-169694 | 6/2002 |
| WO | WO 01/93540 A1 | 12/2001 |

OTHER PUBLICATIONS

Official communication issued in the corresponding Japanese Application No. JP 2006-544549, mailed Oct. 30, 2008.
Srisuresh et al.; "Traditional IP Network Address Translator (Traditional NAT)"; RFC 3022; Network Working Group; Jan. 2001; pp. 1-13.
Postel; "Internet Control Message Protocol"; RFC 792; Network Working Group; Sep. 1981; pp. 1-15.
Alexander; "DHCP Options and BOOTP Vendor Extensions"; RFC 2132; Network Working Group; Mar. 1997; pp. 1-21.
Rigney et al.; Remote Authentication Dial In User Service (RADIUS); RFC 2865; Network Working Group; Jun. 2000; pp. 1-59.
Rigney et al.; "RADIUS Accounting"; RFC 2866; Network Working Group; Jun. 2000; pp. 1-22.

* cited by examiner

*Primary Examiner*—Jude J Jean Gilles
(74) *Attorney, Agent, or Firm*—Alston & Bird LLP

(57) ABSTRACT

Managing addresses to be assigned to users of an IP network is described, in which it is detected that a packet has been addressed to a released address held in a queue for holding released addresses, and the held address to which the packet has been addressed is returned to the end of the queue.

23 Claims, 5 Drawing Sheets

IP ADDRESS MANAGEMENT

FIELD OF THE INVENTION

The present invention relates to an address management in networks in which addresses are allocated dynamically from a limited address pool. In particular, the invention relates to managing addresses in an access network assigning addresses to users of an IP network.

BACKGROUND OF THE INVENTION

IP (Internet Protocol) addresses, such as IPv4 (IP version 4) addresses are a limited resource that has to be recycled: when a user loses a connection, the address will be assigned to a new user. In case the old user has disconnected brutally, i.e. a connection is lost without having a chance to inform correspondent nodes about the connection loss, the address of the old user may have been reassigned to a new user before all of the old user's sessions have expired. As a result, the new user may receive packets that belong to the old user of the IPv4 address. For example, such connection losses are caused by the old user moving out of a coverage area or running out of battery.

Although the new user has not asked for these packets, he has to pay for receiving them anyway. This "overbilling" attack which happens e.g. in GPRS (General Packet Radio Service) and 3G (Third Generation) networks is a security incident.

Typically a stateful FW (FireWall) is used to stop incoming unsolicited packets. However, in the case of brutal disconnect the FW states ("pinholes") are not reset, because the FW has not been notified about the loss of the connection. Both TCP (Transport Control Protocol) and UDP (User Datagram Protocol) packets get through, if they match an old pinhole.

The time to wait until an address can be reassigned, i.e. a "cooling" time, varies, because there are no standard values for either TCP retry limit or UDP soft state lifetime. Typically TCP gives up only after several minutes of trying (depending on implementation), and UDP soft states live at least one minute (depending on FW settings). Sessions can also end if a NAT (Network Address (and Port) Translator) along the path resets an address-port binding, because it has not been used for some predefined time. Details about NAT can be found in P. Srisuresh et al.: "Traditional IP Network Address Translator (Traditional NAT)", Network Working Group, RFC 3022, January 2001. All of the above times can be different, and can be configured at different sites.

For example, an address cooling mechanism using IPv6 is described in applicant's WO 01/93540. However, previous suggestions of address cooling mechanisms have used only an estimate of the longest possible cooling period before an address can be reactivated, and used that to estimate the size of the required cooling queue. Such size may be uncomfortably large for IPv4.

Another suggestion is that the FW should read ICMP (Internet Control Message Protocol) error notifications transmitted to the senders, and close remaining pinholes to released addresses as described in applicant's U.S. 60/479,509. More details about ICMP are described by J. Postel: "Internet Control Message Protocol", Network Working Group, RFC 792, September 1981.

Alternatively it has been suggested to use two FWs, one at Gn side of a GGSN (GPRS Gateway Serving Node) detecting PDP (Packet Data Protocol) context terminations, and another on the Gi side stopping packets to addresses that the first FW reports as unused. This solution is very expensive, because it requires installing FWs in many places. Also it is limited to GPRS and 3G networks.

Moreover, the FW suggestions may not help if a free address pool is small, and a new user happens to activate the same service that the old user had running. In this case the new user opens a pinhole that again lets the old user's session through.

SUMMARY OF THE INVENTION

It is an object of the invention to improve reassigning IP addresses to users in order to avoid extra packets for the users resulting e.g. in the overbilling attack.

According to one embodiment of the invention, a network device for managing addresses to be assigned to users of an IP network is disclosed. The network device includes at least one queue for holding released addresses and the network device is configured to detect that a packet has been addressed to a released address held in the at least one queue and to return the held address to which the packet has been addressed to an end of the at least one queue.

According to another embodiment of the invention, a method of managing addresses to be assigned to users of an IP network is disclosed. The method includes the steps of detecting that a packet has been addressed to a released address held in a queue holding released addresses and returning the held address, to which the packet has been addressed, to an end of the queue.

According to another embodiment of the invention, a network device for forwarding IP data packets is disclosed. The network device is configured to receive a packet addressed to an unused address and to send an error notification to a network node for managing addresses, the error notification indicating the unused address.

According to another embodiment of the invention, a method of forwarding IP data packets is disclosed, where the method includes the steps of receiving a packet addressed to an unused address and sending an error notification to a network node for managing addresses, the error notification indicating the unused address.

According to a further embodiment of the invention, a system for managing addresses to be assigned to users of an IP network is disclosed. The system includes a first network node for managing addresses, where the first network node includes at least one queue for holding released addresses. The first network node is configured to detect that a packet has been addressed to a released address held in the at least one queue and to return the held address to which the packet has been addressed to an end of the at least one queue. Additionally, the system includes a second network node for forwarding IP data packets and the second network node is configured to receive a packet addressed to an unused address and to send an error notification to the first network node, the error notification indicating the unused address.

The invention may also be provided by a computer program product comprising software code portions to be executed by a computer, microprocessor or the like.

According to the invention, the size of a cooling queue will depend on averages, not maximum, because a cooling period of each address will adapt to stack implementations of correspondent nodes of an old user. Troublesome addresses connected to long-living sessions may be sent back to the end of the cooling queue several times. With the invention the number of cooling addresses can be reduced significantly, because a free address pool needs only a few "cold" addresses that rise quickly to the front of the queue.

Furthermore, the solution according to the invention is independent of FW and NAT locations and timers.

Moreover, the cooling method of the invention can be extended to DHCP-(Dynamic Host Configuration Protocol) assigned addresses. Therefore the invention works with any access network.

In the following the present invention will be described by way of preferred embodiments thereof taking into account the accompanying drawings.

DESCRIPTION OF THE INVENTION

Figure 1:
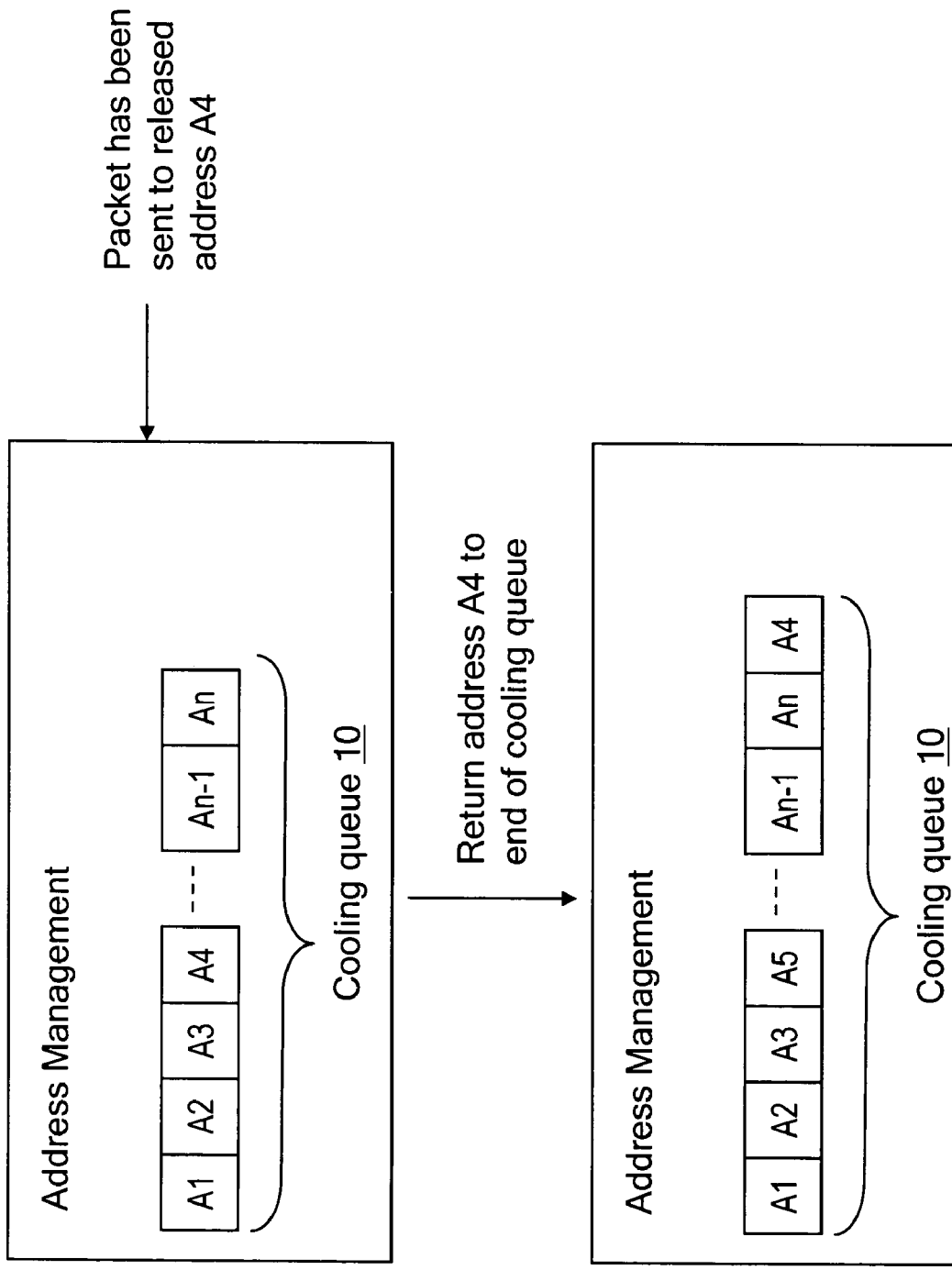
FIG. 1 shows an address management according to the invention in case it is detected that a packet has been sent to a released address.
Figure 2:
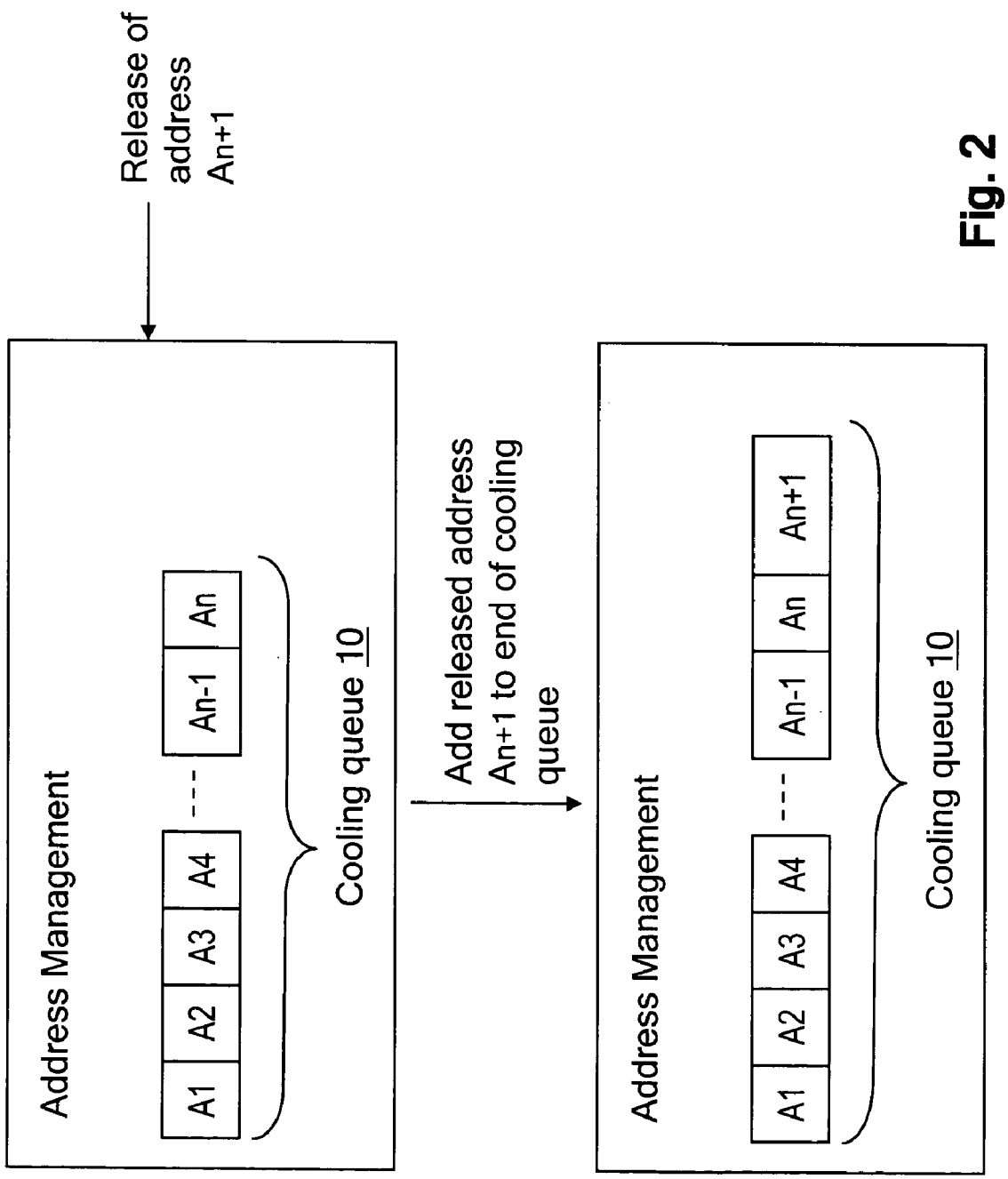
FIG. 2 shows an address management according to the invention in case it is detected that an address has been released.
Figure 3:
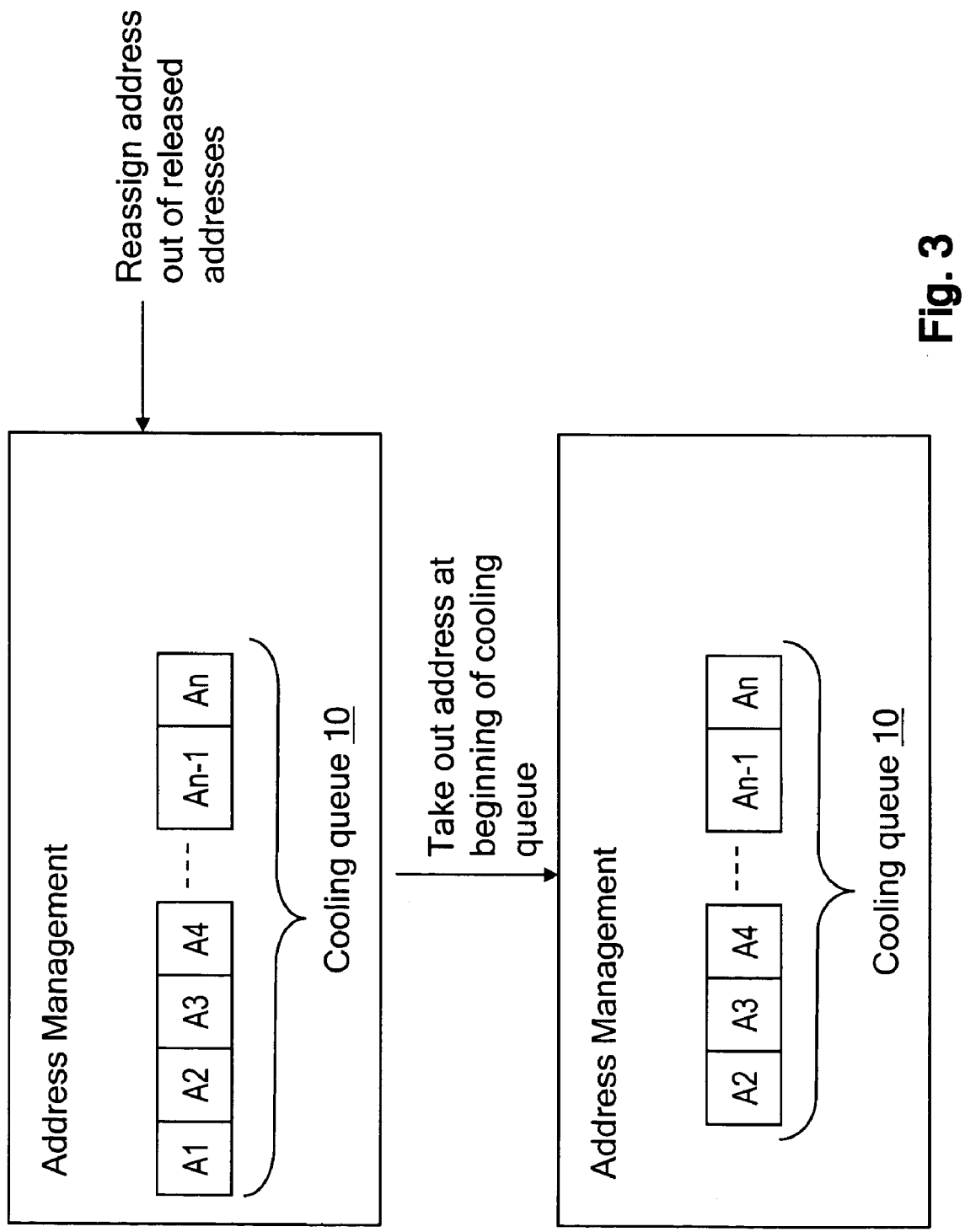
FIG. 3 shows an address management according to the invention in case an address out of released addresses is to be reassigned.

FIGS. 1, 2 and 3 show an address management scheme according to the invention. An address management entity shown in these figures is responsible for assigning addresses to IP network users and comprises a cooling queue 10 for holding released addresses such as released IPv4 addresses. An address release may result from a connection loss which may be due to a brutal disconnect of a user.

The upper part of FIG. 1 shows the cooling queue 10 holding released addresses A1 to An. In case the address management entity detects that a packet has been addressed to a released address held in the cooling queue 10, such as to the released address A4, the released address A4 is shifted to the end of the cooling queue 10. The result of this cooling queue update is shown in the lower part of FIG. 1. As shown in the lower part of FIG. 1, the released addresses A5 to An have moved forward by one place to the front of the cooling queue 10 and the released address A4 is placed at the end of the cooling queue 10.

The upper part of FIG. 2 shows like the upper part of FIG. 1 the cooling queue 10 holding the released addresses A1 to An. In case the address management entity detects that an address of a user has been released, such as an address An+1, the released address An+1 is added to the end of the cooling queue. The result of this cooling queue update is shown in the lower part of FIG. 2.

The upper part of FIG. 3 shows like the upper part of FIGS. 1 and 2 the cooling queue 10 holding the released addresses A1 to An. In case an address out of the released addresses held in the cooling queue 10 is to be reassigned, e.g. because a free address pool is empty, the address at the beginning of the cooling queue is taken out as address to be reassigned. According to FIG. 3, since the address at the beginning of the cooling queue is the address A1, the address A1 is taken from the cooling queue 10 for reassigning. The result of this reassignment is shown in the lower part of FIG. 3.

As described above, the address management entity or Address Manager (AM) that is responsible for assigning addresses lets a released address "cool" until no packets to an old user having had the released address before are received. The cooling mechanism is adaptive: it uses the least-recently-used cooling queue 10. Released addresses go to the end of the cooling queue 10. In case e.g. a free address pool is empty, the first address in the cooling queue 10 (A1 according to FIG. 3) gets assigned to a next new user.

The idea is that each time an address already in the cooling queue 10 receives a packet, the address is returned to the end of the cooling queue 10. In addition, an error message (e.g. ICMP "not reachable") may be returned to a sender or source of the packet, e.g. a correspondent node of the old user, to inform it that sessions to the address are broken.

In case the address management entity is placed in a data path, like a GGSN, it can handle the queue internally. In other words, the address management entity may detect that a packet has been addressed to a released address held in the cooling queue 10 by receiving a packet addressed to the released address. Furthermore, the address management entity may detect that an address of a user has been released by detecting a loss of a connection which releases its address.

Figure 4:
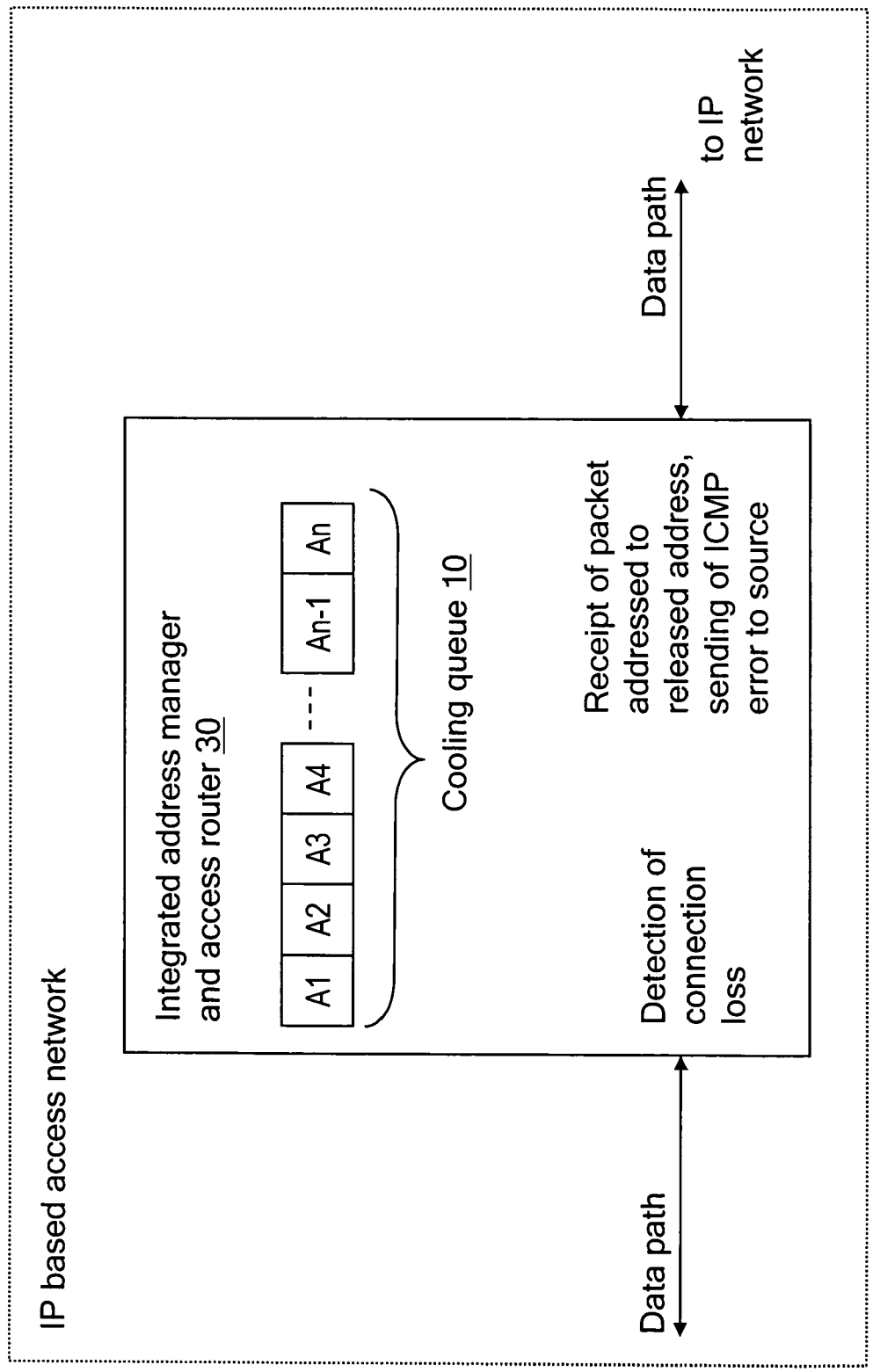
FIG. 4 shows a schematic block diagram illustrating an address management entity according to an embodiment of the invention.

FIG. 4 shows an embodiment of the invention in which the address management entity or address manager is in the data path, i.e., the address manager and an AR (Access Router) are integrated like in a GGSN that manages its own address pool. In FIG. 4, the integrated address manager and access router block 30 is located in an access network, e.g. an IP based access network, providing access to an IP network for a user. The block 30 comprises the cooling queue 10.

In case the functions of the address management entity and those of the access router are combined as shown in FIG. 4, the loss of a connection releases its address, which is added to the end of the cooling queue 10 as shown in FIG. 2. A next released address goes behind it, etc. But each time a packet arrives to a cooling address held in the cooling queue 10, the address is again returned to the end as shown in FIG. 1, and an ICMP error notification may be sent to the source of the packet by the integrated block 30.

Returning a released address repeats until all sessions that are bound to the released address have expired. After that the address can advance to the first position in the queue, and can then be assigned to a new user.

In case the address management entity and the data path are separated like e.g. in DHCP (Dynamic Host Configuration Protocol), an access router along the data path of the old user notifies the address management entity about lost connections, and also sends copies of error messages to the address management entity, the error messages notifying packets sent to unused addresses. The cooling queue is in the address management part. For details about DHCP it is referred to S. Alexander, R. Droms: "DHCP Options and BOOTP Vendor Extensions", Network Working Group, RFC 2132, March 1997.

In other words, in case the address management entity is not located in the data path of the old user, the address management entity may detect that a packet has been addressed to a released address held in the cooling queue 10 by receiving an error notification indicating an unused address. Furthermore, the address management entity may detect that an address of a user has been released by receiving a notification thereon.

In case the access router in the data path receives a packet addressed to an unused address it sends an error notification to the address management entity, the error notification indicating the unused address. In addition, the access router may also send an error notification to a source of the packet. Moreover, in case the access router detects a loss of a connection which releases its address, it sends a notification about the released and now unused address to the address management entity.

Figure 5:
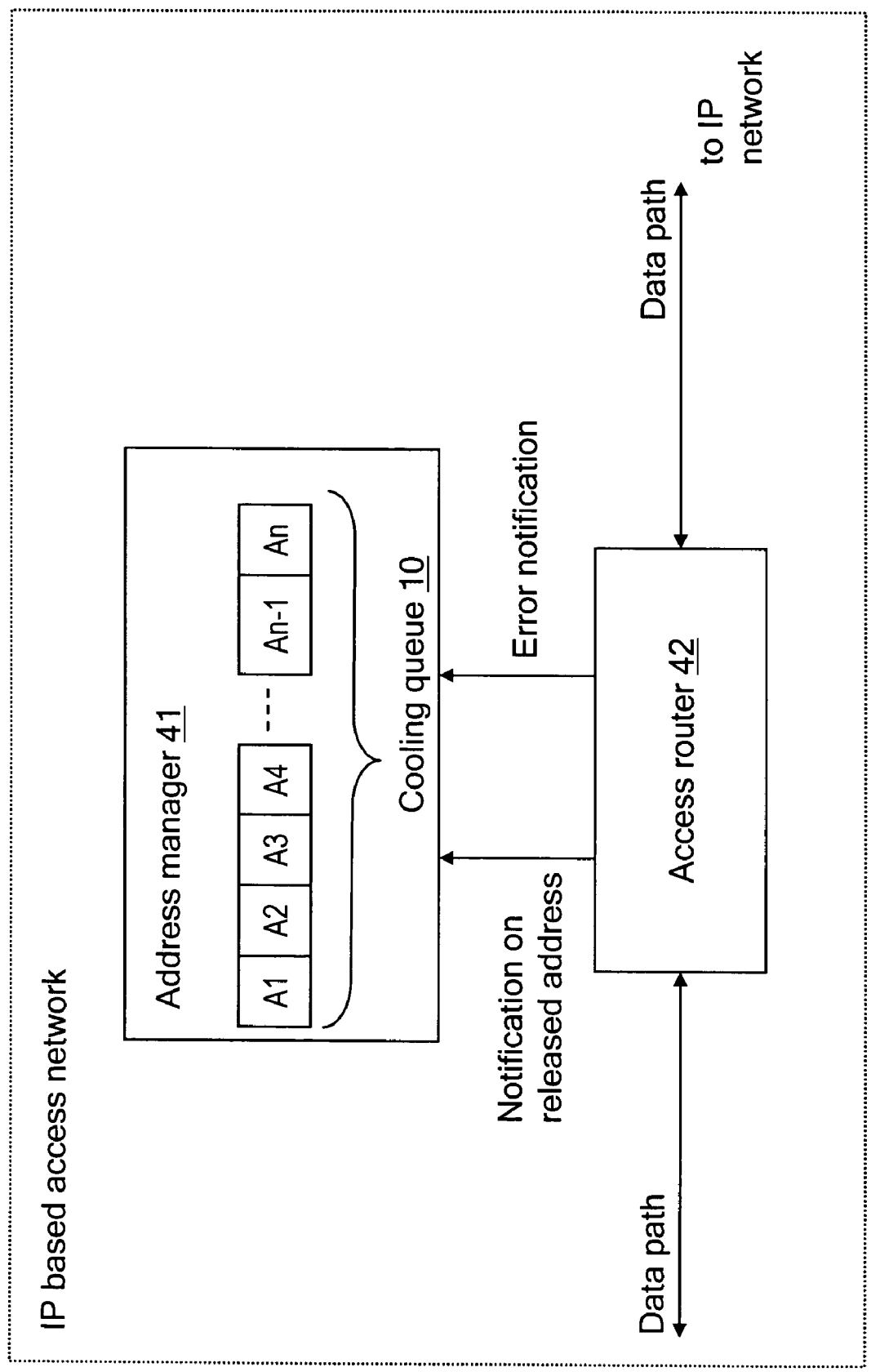
FIG. 5 shows a schematic block diagram illustrating an address management entity according to another embodiment of the invention.

FIG. 5 shows a separated access router 42 and address management entity or address manager 41. The address manager 41 comprises the cooling queue 10. The access router 42 is located in the data path of the old user.

When the access router 42 loses a connection, it notifies the address manager 41 about the address that can be released. The address manager 41 puts the address in the cooling queue 10 as described above in connection with FIG. 2. If the access router 42 later receives a packet to an unused, i.e. released address, it sends an error notification to the address manager 41, which pushes the address to the end of the cooling queue 10 as shown in FIG. 1. The access router 42 may also send an ICMP error as it is done in the integrated case above.

The message from the access router 42 to the address manager 41 to release an address can be RADIUS (Remote Authentication Dial-In User Service 'Accounting Stop'. The access router—address manager error notification protocol can be ICMP, but also a proprietary protocol is possible. Details about RADIUS can be found in C. Rigney et al.: "Remote Authentication Dial In User Service (RADIUS)", Network Working Group, RFC 2865, June 2000, and C. Rigney: "RADIUS Accounting", Network Working Group, RFC 2866, June 2000.

The invention has been explained using a single LRU (Least Recently Used) cooling queue 10 per address range. However, it is possible to classify a released address into a group out of at least two address groups, each address group having its own cooling queue holding released addresses, and to add the released address to the end of the queue of the classified group, the queues being given a priority order for re-assigning the released addresses held in the queues.

In other words, it is possible to classify the addresses as being "troubled", or connected to misbehaving nodes, e.g. those that ignore ICMP errors. For example, an address may be classified as being troubled in case transmission attempts for this address continue in spite of an ICMP error report, or the number of packets sent to this address exceeds a configurable limit. This classification may be carried out by the address management entity such as the integrated address manager and access router 30 or the address manager 41. Troubled addresses may be sent to a special queue by the address management entity which special queue is used for reassigning only when the normal queue (i.e. the cooling queue 10) is empty. Addresses in the queues given a higher priority than the special queue for "troubled" addresses will pass the troubled addresses. This way it is possible to avoid a situation where a non-cooled address gets reassigned, because it has not been accessed for some time, and during that time it has reached the front of the cooling queue 10.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
an address management entity comprising at least one queue configured to hold released addresses, said address management entity configured to
detect that a packet has been addressed to a released address held in the at least one queue, and
return the held address to which the packet has been addressed to an end of the at least one queue, and
wherein the size of the at least one queue is variable and depends on a number of released addresses of correspondent nodes of previous users, and wherein a next address that is selected to be reassigned to a next new user is selected from a first address position of the at least one queue.

2. The apparatus according to claim 1, wherein said address management entity is further configured to
detect that an address of a user has been released, and
add the released address to the end of the at least one queue.

3. An apparatus comprising:
an address management entity comprising at least one queue configured to hold released addresses, said address management entity configured to
detect that a packet has been addressed to a released address held in the at least one queue, and
return the held address to which the packet has been addressed to an end of the at least one queue, wherein said address management entity is further configured to
classify the released address into a group out of at least two address groups, each address group of the at least two address groups having its own queue holding released addresses, and
add the released address to an end of the queue of the classified group, the queues being given a priority order for re-assigning the released addresses held in the queues.

4. The apparatus according to claim 1, further comprising:
wherein said address management entity is further configured to send an error notification to a source of a packet upon detection that a packet has been addressed to the released address held in the at least one queue.

5. The apparatus according to claim 1, wherein said address management entity is further configured to detect that a packet has been addressed to the released address held in the at least one queue by receiving the packet addressed to the released address.

6. The apparatus according to claim 2, wherein said address management entity is further configured to detect that an address of a user has been released by detecting a loss of a connection which releases its address.

7. The apparatus according to claim 1, wherein said address management entity is further configured to detect that a packet has been addressed to the released address held in the at least one queue by receiving an error notification indicating an unused address.

8. The apparatus according to claim 2, wherein said address management entity is further configured to detect that an address of a user has been released by receiving a notification thereon.

9. An apparatus, comprising:
an address management entity configured to
receive a packet addressed to an unused address, and
send an error notification to a network node configured to manage addresses, the error notification indicating the unused address, wherein the error notification causes a return of a released address held in a queue and corresponding to the unused address to an end of the queue, the queue holding released addresses, wherein the size of the queue is variable and depends on a number of released addresses of correspondent nodes of previous users, and wherein a next address that is selected to be reassigned to a next new user is selected from a first address position of the queue.

10. The apparatus according to claim 9, wherein said address management entity is further configured to
detect a loss of a connection which releases its address, and
send a notification about the released address to the network node configured to manage addresses.

11. The apparatus according to claim 9, wherein said address management entity is further configured to
send an error notification to a source of the packet upon receipt of the packet addressed to the unused address.

12. A method, comprising:
detecting that a packet has been addressed to a released address held in a queue holding released addresses, said queue operating on a network element; and
returning the held address, to which the packet has been addressed, to an end of the queue, wherein the size of the queue is variable and depends on a number of released addresses of correspondent nodes of previous users, and wherein a next address that is selected to be reassigned to a next new user is selected from a first address position of the queue.

13. A method, comprising:
receiving a packet addressed to an unused address; and
sending an error notification to a network node configured to manage addresses, the error notification indicating the unused address, wherein sending the error notification further comprises causing a return of a released address held in a queue and corresponding to the unused address to an end of the queue, the queue holding released addresses, wherein the size of the queue is variable and depends on a number of released addresses of correspondent nodes of previous users of released addresses, and wherein a next address that is selected to be reassigned to a next new user is selected from a first address position of the queue.

14. A computer-readable program distribution medium encoding a computer program of instructions being configured to control a processor to perform:
detecting that a packet has been addressed to a released address held in a queue holding released addresses, said queue operating on a network element; and
returning the held address, to which the packet has been addressed, to an end of the queue, wherein the size of the queue is variable and depends on a number of released addresses of correspondent nodes of previous users of, and wherein a next address that is selected to be reassigned to a next new user is selected from a first address position of the queue.

15. The computer program according to claim 14, further comprising:
a computer-readable medium on which the computer program of instructions are stored.

16. The computer program according to claim 14, wherein the computer-readable distribution medium is configured to be directly loadable into an internal memory of the computer.

17. An apparatus, comprising:
holding means for holding released addresses;
detecting means for detecting that a packet has been addressed to a released address held in the at least one holding means; and
returning means for returning the held address to which the packet has been addressed to an end of the at least one holding means, wherein the size of the at least one holding means is variable and depends on a number of released addresses of correspondent nodes of previous users, and wherein a next address that is selected to be reassigned for a next new user is selected from a first address position of the holding means.

18. An apparatus, comprising:
receiving means for receiving a packet addressed to an unused address; and
sending means for sending an error notification to a network node configured to manage addresses, the error notification indicating the unused address, wherein the error notification causes a return of a released address held in a queue and corresponding to the unused address to an end of the queue, the queue holding released addresses, wherein the size of the queue is variable and depends on a number of released addresses of correspondent nodes of previous users, and wherein a next address that is selected to be reassigned to a next new user is selected from a first address position of the queue.

19. The method according to claim 12, further comprising:
sending an error notification to a source of a packet upon detection that a packet has been addressed to the released address held in the at least one queue.

20. The method according to claim 12, further comprising:
detecting that a packet has been addressed to the released address held in the at least one queue by receiving the packet addressed to the released address.

21. The method according to claim 12, further comprising:
detecting that an address of a user has been released by detecting a loss of a connection which releases its address.

22. The method according to claim 12, further comprising:
detecting that a packet has been addressed to the released address held in the at least one queue by receiving an error notification indicating an unused address.

23. The method according to claim 12, further comprising:
detecting that an address of a user has been released by receiving a notification thereon.

\* \* \* \* \*

UNITED STATES PATENT AND TRADEMARK OFFICE
CERTIFICATE OF CORRECTION

PATENT NO. : 7,590,742 B2  Page 1 of 1
APPLICATION NO. : 10/790726
DATED : September 15, 2009
INVENTOR(S) : Lassi Hippelainen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Twenty-first Day of September, 2010

David J. Kappos
*Director of the United States Patent and Trademark Office*